US006893070B2

(12) United States Patent
Baker

(10) Patent No.: US 6,893,070 B2
(45) Date of Patent: May 17, 2005

(54) INTEGRATED END EFFECTOR

(75) Inventor: Aaron E. Baker, China Township, MI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 144 days.

(21) Appl. No.: 10/272,703

(22) Filed: Oct. 17, 2002

(65) Prior Publication Data

US 2004/0075288 A1 Apr. 22, 2004

(51) Int. Cl.[7] .................................................. B25J 15/04
(52) U.S. Cl. ........................ 294/86.4; 294/64.1; 901/40
(58) Field of Search .......................... 294/1.1, 2, 64.1, 294/64.2, 64.3, 65, 86.4, 87.1, 88; 901/30, 31, 40

(56) References Cited

U.S. PATENT DOCUMENTS

| 3,517,958 | A | * | 6/1970 | Boucher et al. ........... 294/64.1 |
| 4,664,588 | A | * | 5/1987 | Newell et al. .............. 414/730 |
| 4,773,687 | A | * | 9/1988 | Bush et al. ................. 294/64.1 |
| 4,931,341 | A | * | 6/1990 | Haffer et al. .................. 428/81 |
| 5,324,155 | A | * | 6/1994 | Goodwin et al. ......... 414/744.5 |
| 5,395,198 | A |   | 3/1995 | Duffy et al. ................. 414/217 |
| 5,879,040 | A | * | 3/1999 | Nagai et al. ................... 294/65 |
| 6,015,174 | A |   | 1/2000 | Raes et al. ...................... 294/2 |
| 6,095,582 | A |   | 8/2000 | Siniaguine et al. ........ 294/64.3 |
| 6,139,078 | A |   | 10/2000 | Bodiker, II et al. ........ 294/64.1 |
| 6,244,641 | B1 | * | 6/2001 | Szapucki et al. .......... 294/64.1 |
| 6,275,748 | B1 |   | 8/2001 | Bacchi et al. ............... 700/275 |
| 6,357,994 | B1 |   | 3/2002 | St. Onge ..................... 414/738 |
| 2001/0000720 | A1 |   | 5/2001 | Goodwin et al. ........... 414/217 |

* cited by examiner

Primary Examiner—Dean J. Kramer
(74) Attorney, Agent, or Firm—Raggio & Dinnin, P.C.

(57) ABSTRACT

An integrated robot end effector for use in a robotic manufacturing environment. The integrated robot end effector generally includes a circular body having a generally circular rim on an edge thereof. The integrated robot end effector also includes a plurality of orifices through a surface of the body. A plurality of ports extend through a predetermined section of the rim or body of the integrated robot end effector. A plurality of grooves in a surface of the body connects the orifices to the ports within the robot end effector. A cover is secured to the rim of the robot end effector by a retainer. The robot end effector internalizes and integrates all external lines servicing associated vacuum cups or grippers located on the outer surface of the robot end effector.

14 Claims, 3 Drawing Sheets

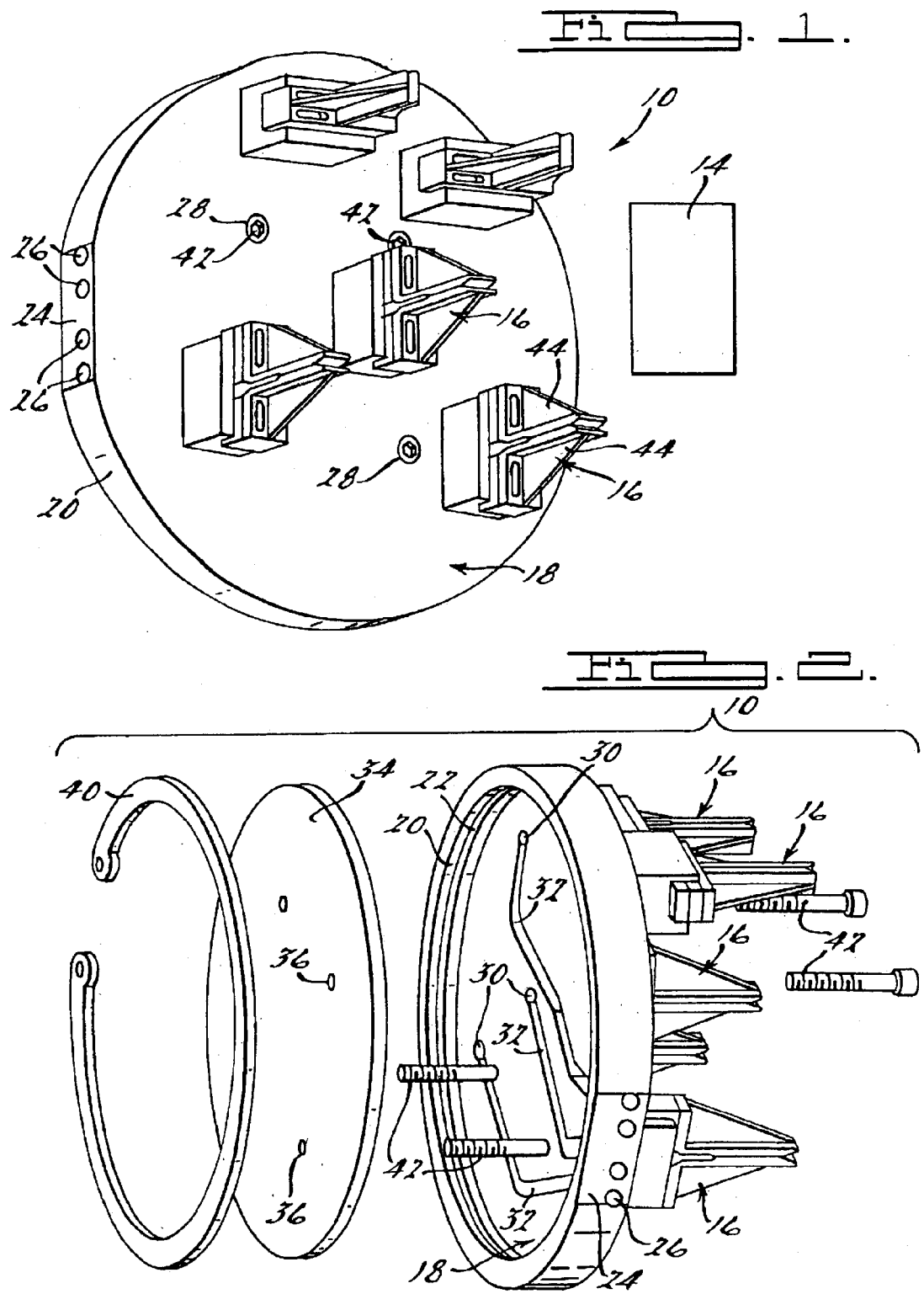

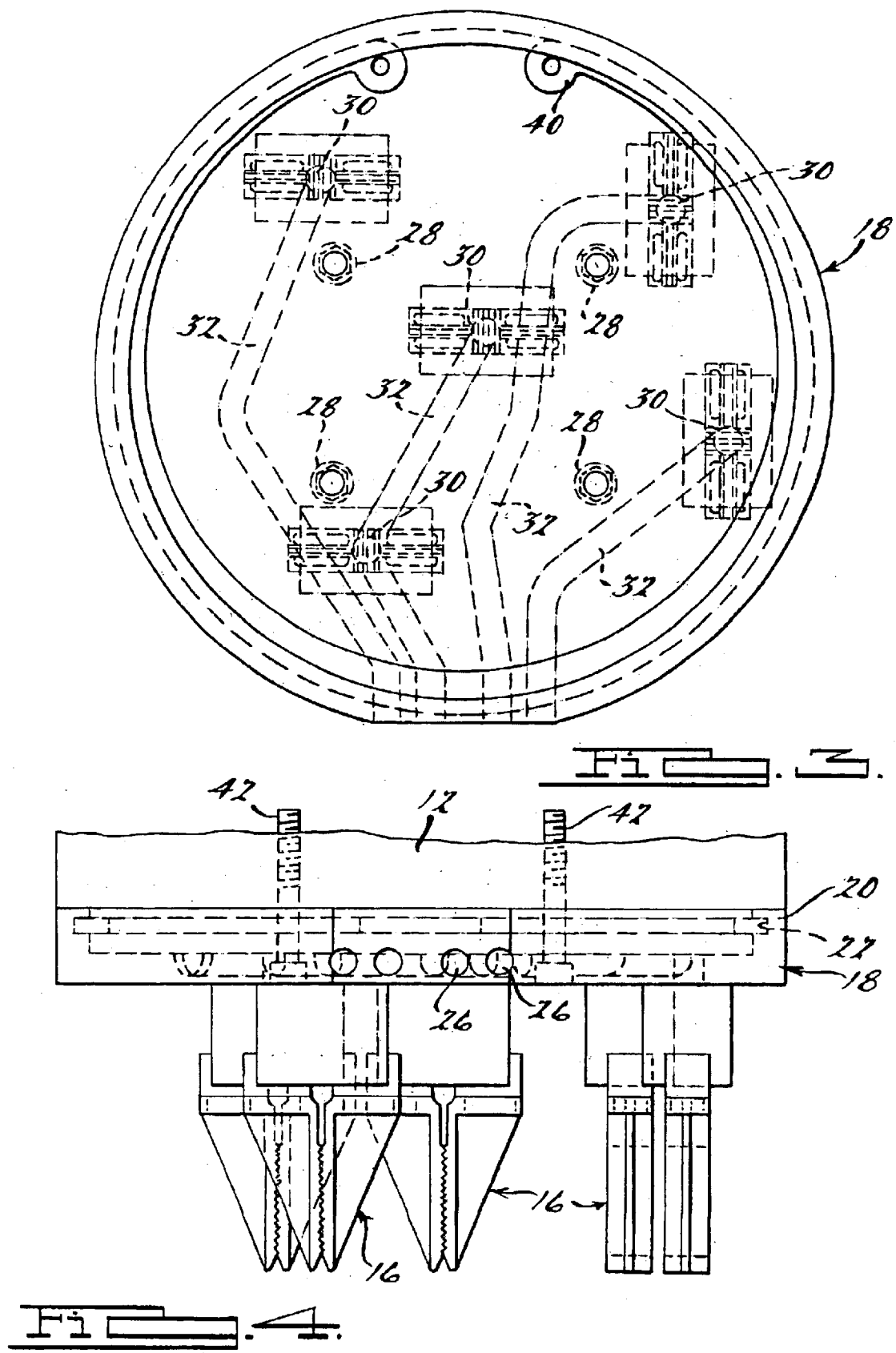

INTEGRATED END EFFECTOR

BACKGROUND OF THE INVENTION

1. Field of the Invention

The present invention generally relates to robots, and more particularly relates to an integrated end effector for a robotic arm or wrist.

2. Description of the Related Art

End effectors for use in assembly systems have been known in the prior art for many years. Generally, in many automated assembly systems, devices are used for holding and placing components or parts in a specified place so that a manufacturing, finishing or other intermediate step can be performed on a product being assembled. These automated assembly systems generally employ many robots that will minimize or eliminate the need for manual intervention thus reducing the cost to the manufacturer of the parts. The parts or the components in such automated systems are typically made by the robot via an arm or wrist by one of two generally known prior art methods. The first method uses an end effector attached to an end of a robot arm and acquires a particular part by the use of a vacuum acquisition member that includes a part that engages a surface of the part being worked on. Thereafter, a vacuum is drawn through an end effector of the robot which therein holds the part to the end effector and places the part in the appropriate position for the work to be performed thereon. The end effector then either releases the part during the work or holds the part steady in a pre specified position during the actual operation on the part. It has also been known to combine proximity sensors with end effectors of robotic arms such that the product being worked on is properly located in the assembly system.

A second known method known in the prior art uses the robotic arm or wrist to acquire a part or component for work thereon by a mechanical gripping action. Generally, the mechanical gripper includes a pair of opposed fingers that are moved in a pinching motion to manipulate into engagement with the component or part being worked on in the assembly system. A number of prior art methods of operating the mechanical fingers are known, such as by pneumatic systems, electrical systems, and/or electro mechanical systems which will allow for the operation of the pinching mechanism or the fingers of the mechanical grippers. Generally, the prior art robotic systems use pneumatic systems to control the end effectors. These pneumatic systems use compressed air and/or air in a vacuum to operate both the vacuum and mechanical gripper robotic end effector systems.

Many of the prior art robot end effector tool assemblies systems were shaped and arranged like a hand having fingers with the mechanical gripper or vacuum component located at the end of each finger. The end effectors resembled hands and included a plurality of tubes connecting the mechanical grippers or vacuum mechanisms to an air source. Therefore, numerous tubes and other components were needed to make the connections air tight between the vacuum components and mechanical grippers on the opposite end of the sealed air system. With all these connections having to be air tight, in order for the system to operate correctly, maintenance is always required to maintain the airtight connections. Furthermore, the prior art end effector systems generally would be bulky and would require a lot of manufacturing environment space because of all the connections and tubes needed to operate the end effector system correctly. Furthermore, the attachment of the end effector to the robot arm was more cumbersome, due to the size of the end effector and all of the tubing that is connected to the end effector in order to operate it correctly under the air pressure necessary. Furthermore, the prior art end effector systems were not as reliable and had shorter life spans in the manufacturing environment because of the numerous parts needed to connect the air system to keep it sealed. The use of these numerous parts would lead to premature failures of some of the tubing and the fasteners used to connect the tubing to the end effector system.

Therefore, there is a need in the prior art for a mechanical gripper or vacuum cup integrated end effector for use on a robotic arm in the manufacturing environment.

There is also a need in the art for an end effector that integrates all of the tubing and other connections for the pneumatic systems to operate the end effector within the body of the end effector thus removing the use and reducing the number of tubes used by the end effector system. Also there is a need in the art for a end effector that is capable of having both mechanical grippers and/or vacuum cups connected thereto thus reducing the need of purchasing separate end effectors for a mechanical and vacuum style end effector system.

SUMMARY OF THE INVENTION

One object of the present invention is to provide an improved robot end effector.

Another object of the present invention is to provide an integrated robot end effector for use with vacuum cups and/or mechanical grippers.

Yet a further object of the present invention is to provide a robot end effector that will internalize much of the pneumatic air system necessary to operate a robot end effector.

Still another object of the present invention is to provide robot end effector that is adaptable to any robot arm or wrist.

Still another object of the present invention is to provide a robot end effector that has a reduced package thus increasing efficiency in the manufacturing environment.

Still another object of the present invention is to provide a robot end effector that reduce the costs and is more reliable thus reducing down time of a manufacturing line.

To achieve the fore going objects an integrated robot end effector according to the present invention is disclosed. The integrated robot end effector includes a generally circular body having a generally circular rim on an edge thereof. A plurality of orifices are located through a surface of the body. A plurality of ports are located through a predetermined section of the rim on the body. A plurality of grooves connect the orifices to the ports. The integrated robot end effector also includes a cover secured to the rim by a retainer. The cover, grooves and ports along with the orifices form a passageway for air to be passed in order to operate the end effector as a vacuum grip end effector or a mechanical gripper end effector.

One advantage of the present invention is that it provides an integrated robot end effector.

Still another advantage of the present invention is that the size of the robot end effector assembly is reduced.

Still another advantage of the present invention is that the integrated robot end effector internalizes many of the hoses and connectors necessary to operate the end effector.

Still another advantage of the present invention is that the robot end effector is easier to manufacture and maintain.

Still another advantage of the present invention is that the robot end effector is capable of being adaptable to any robot arm or wrist.

Yet another advantage of the present invention is that the robot end effector will reduce the number of hoses and tubes around the manufacturing environment of the robotic arm.

Other objects, features, and advantages of the present invention will become apparent from the subsequent description and the appended claims, taken in conjunction with the accompanying drawings.

BRIEF DESCRIPTION OF THE DRAWINGS

FIG. 1 shows a perspective view of an integrated robotic end effector according to the present invention.

FIG. 2 shows an exploded view of an integrated robotic end effector according to the present invention.

FIG. 3 shows a top plan view of the integrated robotic end effector according to the present invention.

FIG. 4 shows a side plan view of a robotic end effector according to the present invention.

DESCRIPTION OF THE EMBODIMENT (S)

Figure 5:
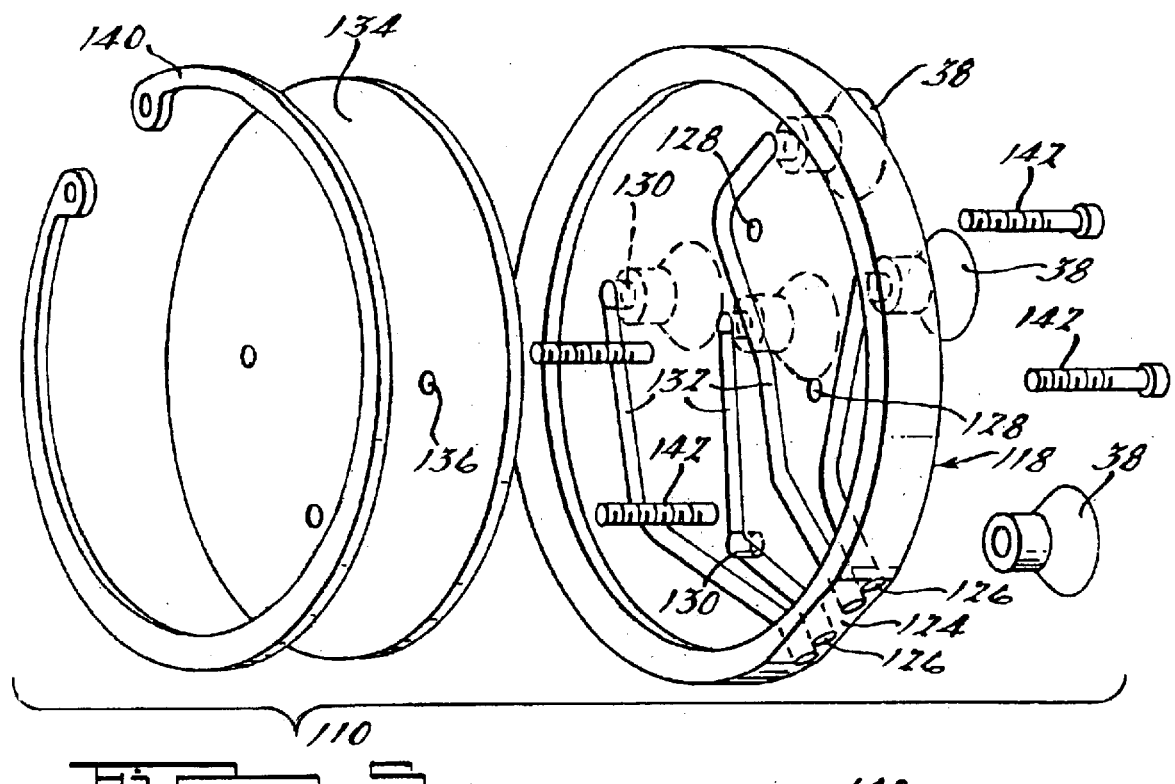
FIG. 5 shows an exploded view of an alternate embodiment of an integrated robotic end effector according to the present invention.

Referring to the drawings, an integrated robotic end effector 10 according to the present invention is shown. The integrated robotic end effector 10 is for use on any known robot that includes a robotic arm and/or robotic wrist 12 and/or any other type of connection between a robot 14 and an end effector that is used to work on a product in the environment of the manufacturing robot 14. The robot end effector 10 is capable of being sized to connect to any known robot arm 12 and is also capable of being sized to pick up any product that is being assembled or worked on in the overall robotic assembly line. The robot end effector 10 will be used to move a product or piece being worked on from one position to another and then released. After the work being performed thereon is complete the robot end effector 10 will once again pick up the piece and move it to another predetermined position. It should be noted that the robot end effector 10 of the present invention can grip anything from 0 to 200 pounds depending on the design requirements and power of mechanical grippers and vacuum cups used therein.

FIGS. 1 through 4 show one embodiment of an integrated robot end effector 10 according to the present invention. The robot end effector 10 eliminates the need for any external pneumatic lines that service the associated mechanical gripper or electromechanical grippers 16 as shown. It should be noted that pneumatic systems are generally used to operate the mechanical grippers 16 but that other known systems such as electrical, fluid or gas operated systems, etc. may also be used. The integrated robot end effector 10 includes a body 18 generally having a circular shape. The body 18 has a rim or lip 20 extending from one end thereof. This will form a u-shaped like cross-section for the body 18 when taken along a diameter thereof as shown in FIG. 4. The body 18 also includes a circular channel 22 along an inside surface of the rim 20 of the body 18. The body 18 also includes a flat surface 24 along a predetermined edge thereof. Through this flat surface 24 is located a plurality of air connection ports 26. In one embodiment there are four ports 26 through the flat surface edge 24 of the body 18. It should be noted the ports 26 may be located completely in the rim 22 or on a lower surface in the body 18 only or may be located such that the ports 26 are through the rim 22 and the body 18. The ports 26 are used to connect an outside pneumatic system or other type of activation system for the grippers 16 or cups used on the robot end effector 10. It should further be noted that in one embodiment the body 18 has a circular shape but that any other contemplated shape for the robot end effector 10 is also contemplated such as triangular, square, polygonal etc.

The body 18 includes a plurality of mounting orifices 28 through a surface thereof. In one embodiment there will be four orifices 28 equi-distantly arranged around a center point of the body 18. A plurality of air orifices 30 are also located through the surface of the body 18. The air orifices 30 will be located at predetermined positions to ensure a uniform pattern and spreading of the gripper mechanisms 16 on a surface of the integrated robot end effector 10. The air orifices 30 may be smooth on an inside surface or may have threads such that a threaded member may be screwed in. In one embodiment a total of five air orifices 30 are placed at predetermined positions through a surface of the body 18 of the robot end effector 10. Generally, the air orifices 30 and mounting orifices 28 have a circular shape but other shapes such as square, rectangular, triangular or any other known hexagonal or polygonal shape may be used depending on the type of fastening needed and the type of fasteners to be used.

The body 18 also includes a plurality of channels or grooves 32 that extend in predetermined patterns between one or some of the plurality of air orifices 30 and the air connection ports 26 located on the side of the body 18. Generally, the grooves 32 have a circular shaped cross-section and are either machined or cast into an inside surface of the integrated robot end effector 10. It should be noted that the pattern followed by the groove 32 is such that it avoids the plurality of mounting orifices 28 and/or some of the plurality of air orifices 30. One possible pattern for such grooves 32 is shown in FIG. 3. However, it should be noted that other patterns for the grooves 32 are contemplated and will be used. As shown in FIG. 3 there are a total of four grooves 32 with two of the air orifices 30 sharing the same groove32. Any shape, width or depth groove 32 may be used depending on the pneumatic system or other air system being used to control the robot end effector 10. It should be noted that in one embodiment the circular shape groove 32 is used but that any other shaped groove 32 may be used such as triangular, square, polygonal or any other know shape for the groove 32 depending on the needs and requirements of the pneumatic system. It is also contemplated to use a separate groove 32 for each air orifice 30 or to use a combination of grooves to interconnect greater than the five orifices as shown in the figures. Therefore, any combination of grooves 32 with respect to number, quantity and type is contemplated and may be used for the present invention. The groove 32 in combination with the air orifices 30 and air connection ports 26 will create a passageway for delivery of air or other substance used to operate the robot end effector 10. The passageway will allow for fluid/gas communication between the ports 26 and air orifices 30.

In one embodiment the body 18 is made of an aluminum material however, it should be noted that it is contemplated to use any other known metal material or composite or any dimensionally stable polymer compound to create and make the body 18 of the robot end effector 10. It should further be noted that one embodiment shows a serpentine like pattern for the grooves 32 but that any other known pattern may be used to machine, cast, etc. the grooves 32 into the inner surface of the body 18 such as straight lines, right angle lines, etc. The size of the body 18 is also contemplated to be different sizes to accommodate different size robot wrist and robot arms 12 along with different size objects to be moved and manufactured in the assembly process.

The integrated robot end effector 10 according to the present invention also includes a circular disc like cover 34. The cover 34 has a plurality of mounting orifices 36 through a surface there of that align with and mate with the mounting orifices 28 on the body 18 of the robot end effector 10. The cover 18 will be secured to a surface of the body 18 of the robot end effector 10. The body 18 will form with the grooves 32 and cover 34 the sealed air passageways as described above. These air passageways will be air tight connections and will allow a pneumatic system to either draw a vacuum or apply pressurized air to mechanical grippers 16 or vacuum caps 38 connected to an outer surface of the body 18 of the robot end effector 10. The cover 34 will be made of similar materials or different materials from that of the body 18. It should be noted that the shape of the cover 34 might also be different and/or match whatever shape the body 18 has. The cover 34 must allow for an airtight connection between the cover 34 and the body 18 to allow for the pneumatic system to operate the end effector 10 in a proper manner. A seal is located in one contemplated embodiment between the cover 18 and the rim 20 or body 18 of the robot end effector 10 to ensure a complete airtight pneumatically sealed environment. This will allow the passageways to operate correctly in moving air through either a vacuum or under pressure to operate the robot end effector 10. Therefore, the machining of the cover 34 is important such that it has a flat surface that will mate with the flat inner surface of the body 18 to ensure airtight connections between and around the grooves 32 and the cover 34. It is also contemplated to include a rubberized epoxy or other material along the edge of the grooves 32 to ensure a pneumatic leak free environment for the robot end effector 10.

In one embodiment a circular cover retainer 40 is located within the circular channel 22 in the wall or rim 20 of the robot end effector body 18. This cover retainer 40 will hold the cover 34 firmly in place on the body 18 to ensure the pneumatic environment is maintained. The cover retainer 40 generally forms a c-shape and is placed within the circular channel 22 and via a spring action is moved into the channel 22 and is then tightened via any known fastener to the cover 34 or any part of the body 18, to ensure proper sealing between the cover 34 and body 18. It is also contemplated to use normal fasteners directly between the body 18 and the cover 34 to ensure the airtight seal. Any known metal or hard plastic, ceramic or composite material may be used for the retainer 40 or fasteners used to secure the cover 34 to the body 18 in the robot end effector 10.

A plurality of mounting studs 42 are placed through the mounting orifices 28 of the body 18 and then through the mounting orifices 36 of the cover 34. The mounting studs 42 are then connected to the robot arm 12 via orifices therein. The mounting studs 42 will secure the robot end effector 10 to the arm 12. It should be noted that contemplated mounting studs 42 are threaded screws, machine screws, etc. that will be screwed manually or automatically to the robot arm. Other types of mounting studs 42 such as pins that can be automatically or manually installed on a robot arm 12 are also contemplated. Therefore, any other type of fastener known in the robotic art or any other mechanical art maybe used to secure the robot end effector 10 to the robot arm or wrist 12.

In the embodiment shown in FIGS. 1 through 4 a plurality of mechanical grippers 16 are attached to the air orifices 30 on the outside surface of the robot end effector 10. The mechanical grippers 16 include a plurality of fingers 44 that are operated by pressurized air, electronics or electro mechanical devices. The mechanical grippers 16 will open their fingers 44 and then close the fingers 44 around the product being moved to a specified workstation within the assembly environment. In one embodiment a pneumatic system will use pressurized air to open and close the mechanical fingers 44 allowing for the quick and efficient movement of the product being work on in the assembly area. The pneumatic system is connected to the ports 26 on the side of the robot end effector 10 and then on to a robot 14 and the robot control unit and will operate in unison to regulate the robot 14 movements and the manipulation of the fingers 44 to release and hold parts and move parts to certain specified areas in the assembly operation.

Figure 6:
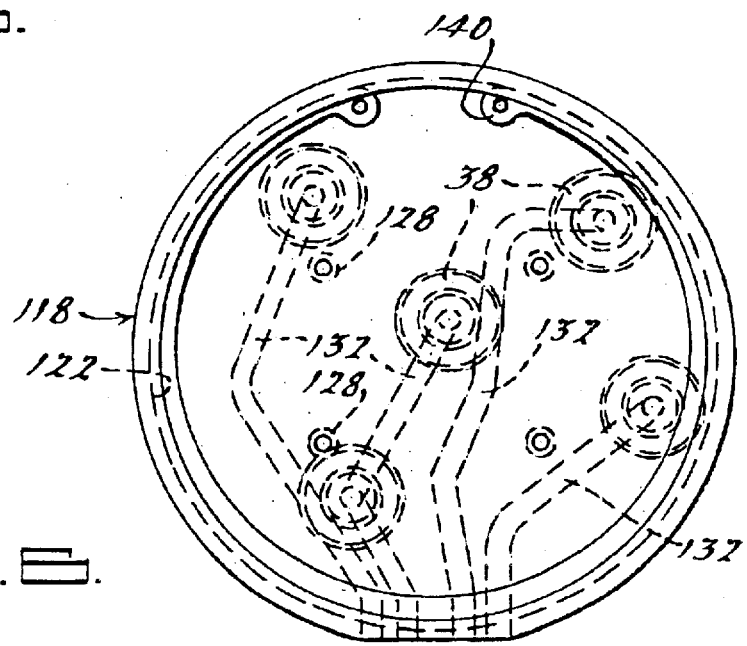
FIG. 6 shows a top plan view of the alternate embodiment of the integrated robotic end effector according to the present invention.
Figure 7:
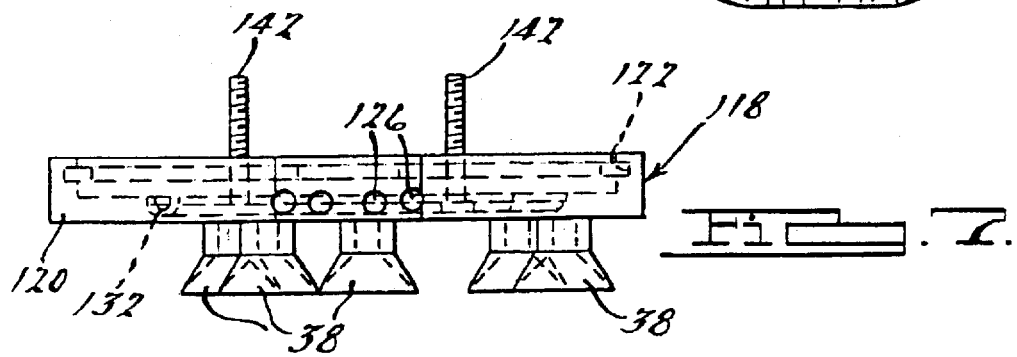
FIG. 7 shows a side plan view of the alternate embodiment of an integrated robotic end effector according to the present invention.

FIGS. 5 through 7 show an alternate embodiment of the robot end effector 110 according to the present invention. Like numbers indicate like parts. The robot end effector body 118, cover 134 and mounting apparatuses are similar to those described as above and will not be described again. The difference is in the vacuum cups 38 that are connected to the air orifices 130 on an outer surface for the robot end effector body 118. The vacuum cups 38 will be used to hold a piece or product being operated on in a manufacturing environment and move it from one area to another area by applying a vacuum through the vacuum cups 38 on to the surface of the product being worked on and releasing that vacuum when the product is in its new predefined assembly operation position. After the assembly operation is performed on that product the vacuum cup robot end effector 110 will then be placed over the part and a vacuum will be applied via the pneumatic passageways formed by the grooves 132 and cover 134 on the robot end effector 110 and will lift and move the piece to another position and release the vacuum thus releasing the part to its new predetermined position. The vacuum cups 38 generally have a cone shaped end with a circular neck extending from one end of the cone shaped cup. The vacuum cups 38 are generally made of a flexible material but any other type or known vacuum cup may be used. It should also be noted that it is contemplated to have a combination mechanical gripper 16 and vacuum cup 38 system on one robot end effector. It is also possible to replace the mechanical gripper 16 with all vacuum cups 38 in a relatively short time to ensure for flexibility of the robot end effector 10 in the manufacturing environment.

In operation the robot end effector 10 is secured to a robot wrist or robot arm 12 by either manual intervention or an automatic connection of the mounting studs 42 to the robot arm or robot wrist 12. The robot arm 12 will then be positioned over a product to be worked on in an assembly process. The robot arm 12 will place the robot end effector 10 having either the mechanical gripper 16 or vacuum cups 38, on to the product being worked and will engage the pneumatic system to capture the product being worked on and lift and move the product being worked on to a second predefined position on the assembly operation line. Once the product is placed at its second predetermined position the robot end effector 10 will disengage the pneumatic system and release the product at its new predetermined position and move away for the operation to be performed thereon. After the operation is performed by the robot 14, the robot arm 12 will place the robot end effector 10 once again over the part and enable the pneumatic system and move the part to the next predetermined position and so on until the product is completely assembled.

It should further be noted that the robot end effector 10 of the current invention completely integrates and internalizes many if not all of the pneumatic lines, hoses and connectors found in the prior art. The prior art robot end effector/hand generally would have hoses, connectors and the like extending around and from the end of the robot end effector to allow for proper operation of the pneumatic system in the working environment. These hoses and connectors were subject to high rates of failures and also cluttered the manufacturing environment which could cause entanglements and have accidents that could lead to down time of the robotic lines. Therefore, the present invention completely internalizes and integrates the pneumatic system within the robot end effector 10 thus removing the use of multiple connectors and hoses in the system. Only the hoses connected to the outer side of the robot end effector 10 are needed, all other hoses and connectors as found in the prior art systems that go from the initial connection out to the grippers and or vacuum cups are eliminated. This will allow for a smaller package robot end effector and will clean up and reduce the complexity of the robotic operation and the robotic environment. It should also be noted that it is more efficient and quicker to change out robot end effectors by just disconnecting the hoses at one certain area and not having to worry about down time due to the failure of hoses and connections in the robotic environment. Therefore, the need for any external pneumatic lines servicing associated vacuum cups or grippers will be completely eliminated from that as shown in the prior art with the robot end effector integrating all such external pneumatic lines. It should also be noted that the package size will be reduced such that the thickness of the end effector system is approximately 1" but can be anywhere from ¼" up to 10" depending on the need and power needed for the robot end effector.

The present invention has been described in an illustrated manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise then as specifically described.

What is claimed:

1. A robot end effector, said end effector including:
   a body;
   a plurality of orifices through a surface of said body, said body generally having a circular shape, said body having a wall extending from an edge;
   a plurality of grooves on a surface of said body;
   a plurality of ports through said wall of said body, said grooves are in communication with said ports on an end thereof and a predetermined number of said orifices on an opposite end thereof; and
   a cover secured to said body, said grooves and cover form a plurality of passageways through which a gas or liquid moves.

2. The end effector of claim 1 further including a cover retainer.

3. The end effector of claim 1 further including a plurality of fasteners for mounting of the end effector.

4. The end effector of claim 1 further including a flat surface on an outer edge of said body.

5. The end effector of claim 1 wherein said body and said cover are made of an aluminum material.

6. The end effector of claim 1 wherein said body and said cover are made of a composite material.

7. The end effector of claim 1 further including a plurality of vacuum cups secured to said body.

8. The end effector of claim 1 further including a plurality of grippers secured to said body.

9. An integrated robot end effector, said end effector including:
   a generally circular body having a generally circular rim on an edge thereof, said rim having a circular channel on an inside surface thereof;
   a plurality of orifices through a surface of said body;
   a plurality of ports through a predetermined section of said rim;
   a plurality of grooves in said body connecting a predetermined number of said orifices to said ports; and
   a cover secured to said body by a retainer.

10. The end effector of claim 9 further including a seal between said cover and said rim.

11. The end effector of claim 9 further including a plurality of fasteners for mounting the end effector.

12. The end effector of claim 9 wherein said body and said cover are made of an aluminum or composite material.

13. The end effector of claim 9 wherein said cover, said ports, and said predetermined orifices form internal passageways for the end effector.

14. A robot, said robot including:
   a robot arm;
   an integrated end effector connected to said robot arm, said integrated end effector generally having a circular body with a rim on one end thereof, said body having a plurality of air orifices and mounting orifices through a surface thereof, said rim having a plurality of ports therethrough, said body having a plurality of grooves connecting said air orifices and said ports, said, end effector having a cover secured to said body by a retainer mechanism, said cover having a plurality of mounting orifices which align with said mounting orifices of said body, said air orifices having a plurality of vacuum cups or grippers secured therein, said air orifices, said grooves, and said ports forming an internal air passageway for said end effector; and
   a plurality of mounting fasteners secured between said end effector and said robot arm via said mounting orifice.

* * * * *